United States Patent [19]

Sakata et al.

[11] Patent Number: 5,442,685
[45] Date of Patent: * Aug. 15, 1995

[54] AUTOMATIC TELEPHONE ANSWERING APPARATUS INCLUDING CONVERSION RECORDING MODE

[75] Inventors: Toshihiko Sakata, Fukuoka; Yoshihiro Shirakawa, Kasuga, both of Japan

[73] Assignee: Matsushita Electric Industrial Co., Ltd., Japan

[*] Notice: The portion of the term of this patent subsequent to Jan. 11, 2011 has been disclaimed.

[21] Appl. No.: 145,649

[22] Filed: Nov. 4, 1993

Related U.S. Application Data

[63] Continuation-in-part of Ser. No. 888,441, May 28, 1992, Pat. No. 5,278,896, Continuation of Ser. No. 714,425, Jun. 12, 1991, abandoned.

[30] Foreign Application Priority Data

Jun. 13, 1990 [JP]   Japan .................. 2-154777

[51] Int. Cl.⁶ ........................................... H04M 1/64
[52] U.S. Cl. .............................. 379/88; 379/79; 379/81; 379/82; 379/85; 379/67
[58] Field of Search ............... 379/85, 88, 79, 70, 379/82, 67, 81

[56] References Cited

U.S. PATENT DOCUMENTS

| | | | |
|---|---|---|---|
| 4,049,916 | 9/1977 | Danner | 179/6 |
| 4,421,954 | 12/1983 | Mita et al. | 179/6.13 |
| 4,469,919 | 9/1984 | Nakamura et al. | 179/6.06 |
| 4,654,485 | 3/1987 | Yamamoto | 379/73 |
| 4,759,052 | 7/1988 | Hashimoto | 379/70 X |
| 4,821,311 | 4/1989 | Hashimoto | 379/88 |
| 4,829,556 | 5/1989 | Hashimoto | 379/79 |
| 4,833,704 | 5/1989 | Hashimoto | 379/79 |
| 4,847,889 | 7/1989 | Esworan | 379/76 X |
| 4,856,051 | 8/1989 | Ohtawara et al. | 379/88 |
| 4,903,289 | 2/1990 | Hashimoto | 379/88 X |
| 4,965,569 | 10/1990 | Bennett et al. | 379/56 X |
| 4,998,272 | 3/1991 | Hawkins, Jr. et al. | 379/88 |
| 5,014,297 | 5/1991 | Morita et al. | 379/82 |
| 5,163,082 | 11/1992 | Karnowski | 379/88 |
| 5,259,022 | 11/1993 | Kuok et al. | 379/67 |
| 5,278,896 | 1/1994 | Sakata et al. | 379/70 |

FOREIGN PATENT DOCUMENTS

| | | | |
|---|---|---|---|
| 60-217753 | 10/1985 | Japan | 379/85 |
| 3132139 | 6/1991 | Japan | 379/85 |

OTHER PUBLICATIONS

"TAD-252 Owner's Manual" 1987 Radio Shack.

*Primary Examiner*—James L. Dwyer
*Assistant Examiner*—Daniel S. Hunter
*Attorney, Agent, or Firm*—Parkhurst, Wendel & Rossi

[57] ABSTRACT

An automatic telephone answering apparatus sends an out-going message recorded in a memory through a telephone line and records in-coming messages in another in-coming message memory. In addition, the apparatus records a conversation between an operator and a partner. The apparatus includes a line status detector that detects the status of the telephone line and a controller that is responsive to the line status detector for effecting a predetermined preparation operation. The apparatus further includes a control mechanism for detecting an area of the in-coming message memory where in-coming messages are stored and detecting an empty area of the in-coming message memory. The controller effects the preparation operation by causing the control mechanism to detect the empty area.

54 Claims, 7 Drawing Sheets

AUTOMATIC TELEPHONE ANSWERING APPARATUS INCLUDING CONVERSION RECORDING MODE

This is a continuation-in-part of patent application Ser. No. 07/888,441, filed on May 28, 1992, now U.S. Pat. No. 5,278,896, which is a continuation of patent application Ser. No. 07/714,425, filed on Jun. 12, 1991, now abandoned.

BACKGROUND OF THE INVENTION

1. Field of the Invention

This invention relates to an automatic telephone answering apparatus.

2. Description of the Prior Art

An automatic telephone answering apparatus is known, which comprises a telephone, a first tape recorder for answering, and a second tape recorder for recording an incoming message, wherein the second tape recorder can record an ordinary conversation between an operator and his conversation partner in response to a recording switch. In such prior art automatic telephone answering apparatus, the operator can playback the magnetic tape where the conversation is recorded after their communication.

However, in such prior art telephone answering apparatus, there is a problem as follows:

If a call occurs when the second tape recorder reproduces a recorded message, the second tape recorder stops reproducing automatically at an intermediate tape-travelling position of the recorded messages. Then, the caller begins to communicates with the operator. If the operator tries to record his conversation with the caller, he cannot record it immediately because the tape is stopped at a tape position where tile messages had been recorded. That is, he must carry out the fast-forward to an end tape position of recorded messages and then, he must start to record. If not, messages recorded in the tape which have not been heard are erased.

SUMMARY OF THE INVENTION

The present invention has been developed in order to remove the above-described drawbacks-inherent to the conventional automatic telephone answering apparatus.

According to the present invention there is provided a first automatic telephone answering apparatus for sending an out-going message recorded in a first storing circuit through a telephone line and recording incoming messages in a second storing circuit, tile automatic telephone answering apparatus further having a further mode for recording a conversation between all operator and a conversation partner, comprising: a line status detector for detecting a line status of the telephone line; and a controller responsive to the line status detector for effecting a predetermined preparation operation when the line status detector detects a start of use of the telephone line in order to record the conversation.

According to the present invention there is provided a second automatic telephone answering apparatus including the elements in the first automatic telephone answering apparatus, further comprising: a second controller responsive to the second storing circuit for detecting an area of the second storing circuit where the incoming messages is stored and for storing data indicative of the area; and a third controller for detecting an empty area of the second storing circuit in accordance with the data, the first mentioned controller effects the preparation operation by causing the third controller to detect the empty area.

According to the present invention there is provided a third automatic telephone answering apparatus including the elements in the first automatic telephone apparatus, further comprising: a reproducing circuit response to a reproducing command signal for reproducing one of the stored incoming messages; and a reproducing detector responsive to the reproducing circuit for detecting a reproducing condition of the reproducing circuit, the first mentioned controller effecting the preparation operation by causing the reproducing circuit to stop the reproducing of the one of the stored incoming messages when the reproducing detector detects the reproducing condition and the line status detector detects the start of use of the telephone line.

According to the present invention there is provided a fourth automatic telephone answering apparatus including the elements in the first automatic telephone apparatus, further comprising: an out-going message recording circuit responsive to an out-going message command signal for inputting and storing the out-going message into the first storing circuit; and a recording detector responsive to the recording circuit for detecting a recording condition of the out-going message recording circuit, the first mentioned controller effecting the preparation operation by causing the out-going message recording circuit to stop the recording of the out-going message when the recording detector detects the recording condition and the line status detection circuit detects the start of use of the telephone line.

According to the present invention there is provided a fifth automatic telephone answering apparatus including the elements in the first automatic telephone apparatus, further comprising: a fourth controller responsive to a recording command signal for effecting the further mode.

According to the present invention there is also provided a sixth automatic telephone answering apparatus for sending an out-going message recorded in first storing circuit through a telephone line and recording incoming messages in second storing circuit, the automatic telephone answering apparatus further having a further mode for recording a conversation between an operator and a conversation partner, the second storing circuit storing one of the incoming messages and the conversation in response to first address signal, the second storing circuit reading one of the incoming messages and the conversation in response to second address signal, comprising: a first controller responsive to the second storing circuit for detecting an area of the second storing circuit where the incoming messages are stored and for storing data indicative of the area; a second controller for detecting an empty area of the second storing circuit in accordance with the stored data; a reproducing circuit responsive to a reproducing command signal for supplying the second address signal to the second storing circuit in accordance with the stored data, for causing the second storing circuit to read the stored one of the incoming messages with the supplied second address signal, and for reproducing the read one of the incoming messages; a line status detection circuit for detecting a line status of the telephone line; and a third controller responsive to the line status detection circuit for causing the second controller to detect tile empty area when the line status detection circuit detects a start of use of the telephone line in order to supply the first address signal in accordance with the detected empty area to the second storing circuit and to cause the second storing circuit to store the conversation with the supplied first address signal.

The start of use of the telephone line may be detected by a ring signal, off-hook action, or a state of the telephone line. The recording of conversation may be done in non-automatic answering mode. The recording of the conversation may be performed in response to an additional condition of the presence of a recording command signal. The recording of the conversation is performed after stopping of reproducing of one of incoming messages or recording of an out-going message.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention of an automatic telephone answering with reference to drawings.

Figure 1:
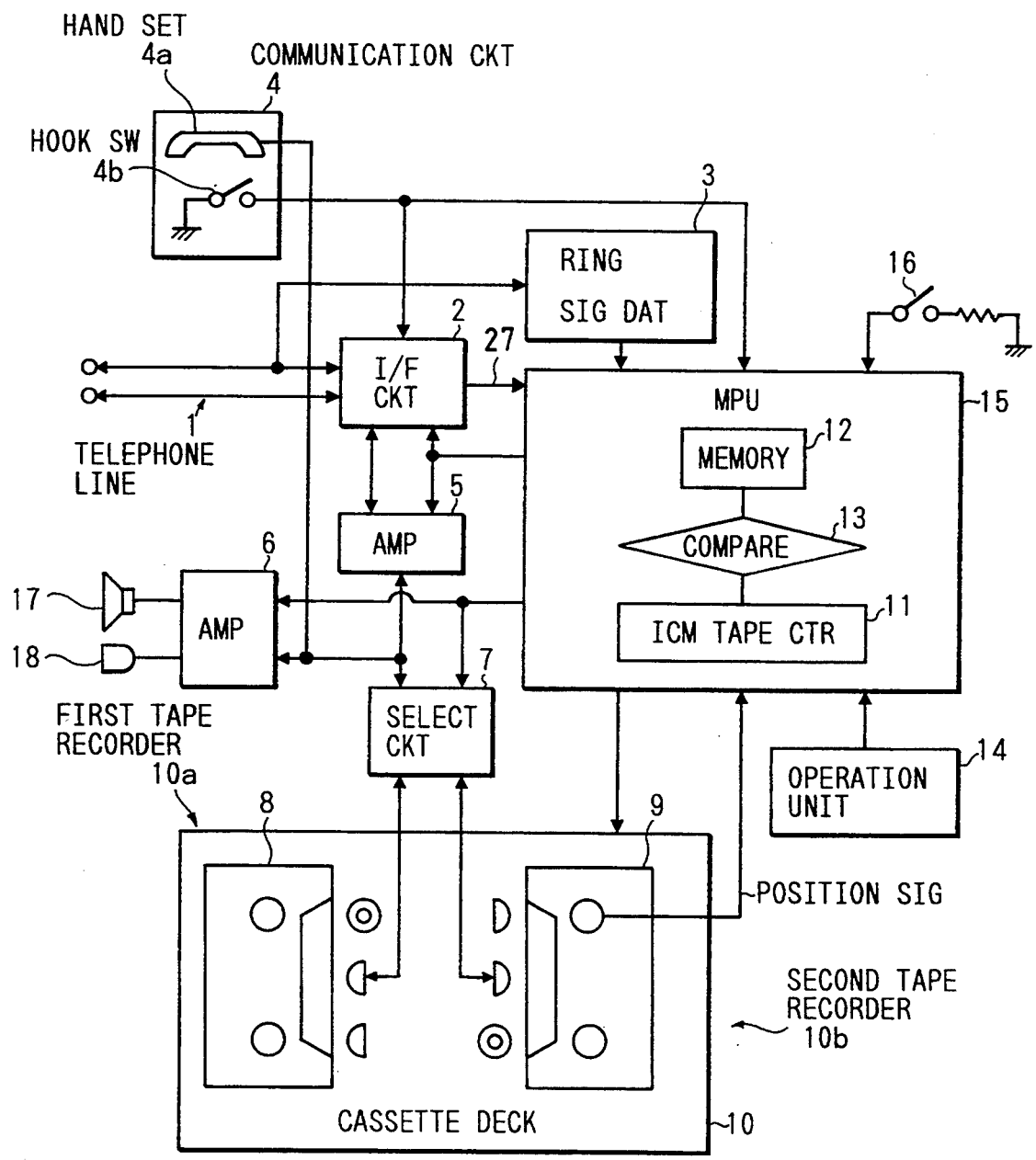
FIG. 1 is a block diagram of a first embodiment of the invention of the automatic telephone answering apparatus.

FIG. 1 is a block diagram of a first embodiment of the invention of the automatic telephone answering apparatus. In FIG. 1, the automatic telephone answering apparatus comprises an interface circuit 2 for communicating with an external telephone through a telephone line 1 and for supplying a line status signal 27 to a control circuit 15, a ring signal detection circuit 3 for detecting a ring signal sent through the telephone line, a communication circuit 4 for communicating with a caller or a conversation partner, which includes a hand set 4a and a hook switch 4b, a voice signal amplifier 5 including an output amplifier (not shown) for amplifying an out-going message (OGM) from a first tape recorder 10a and an input amplifier (not shown) for amplifying to record an incoming message, an output/input amplifying unit 6 including an microphone input amplifier used for recording the out-going message by the first tape recorder 10a and reproducing output amplifier for reproducing the incoming message from the second tape recorder 10b, a cassette deck 10 including the first tape recorder (first recording/reproducing unit) 10a for recording/reproducing an out-going message on a cassette magnetic tape (OGM tape) 8 and the second tape recorder (second recording/reproducing unit) 10b for recording/reproducing a message on/from a cassette magnetic tape (ICM tape) 9, a selection circuit 7 for selecting a voice signal from the first tape recorder 10a or the second tape recorder 10b, and the control circuit 15.

Out-going messages are recorded on the magnetic tape (OGM tape) 8 by the first tape recorder 10a. Incoming messages are recorded on the tape (ICM tape) 9 by the second tape recorder 10b. The control circuit 15 comprises a microprocessing unit (MPU) for controlling the interface circuit 2, the voice signal amplifier 5, the selection circuit 7, the cassette deck 10, and the input output amplifier 6 in response to the ring signal detection circuit 3, a mode switch 16, the hook switch 4b, a position signal from the cassette deck 10 and an operation unit 14. The MPU 15 includes a storing function (counter memory) 12 for storing a counting value of the tape end position of serially recorded messages, a counting function (ICM tape counter) 11 for counting rotations of a reel of the ICM tape 9, and a comparing function 13 for comparing the stored counting value with the present counting value.

The mode switch 16 produces a mode signal of an automatic answering mode or not. A speaker 17 reproduces the voice signal from the OGM tape 8 or ICM tape 9. The microphone 18 receives a sound of a voice from the operator to record it as an out-going message on the tape 8.

Figure 2:
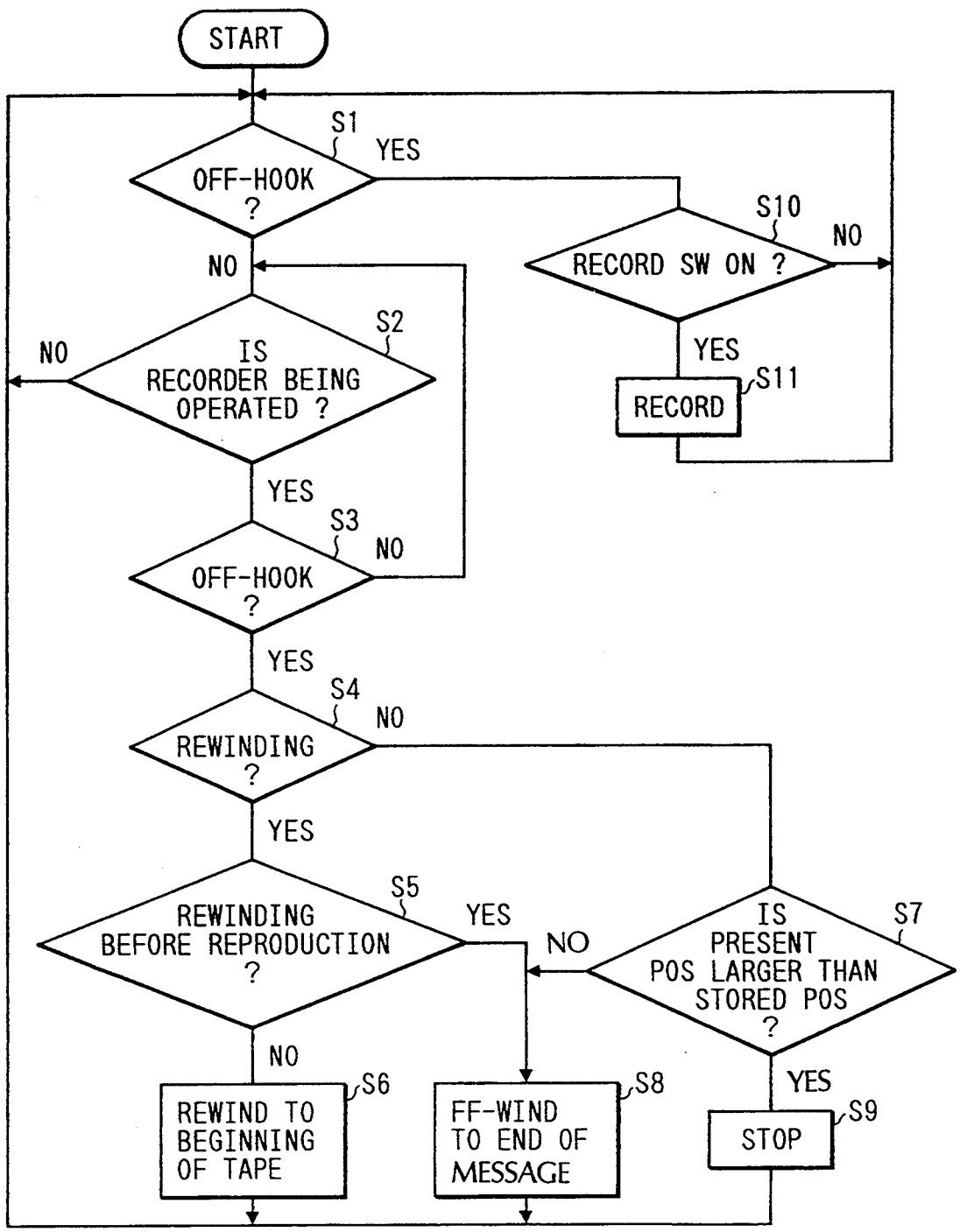
FIG. 2 shows a flow chart of the automatic telephone answering apparatus of the first embodiment.

Hereinbelow will be described operation of the automatic telephone answering apparatus with reference to FIG. 2. FIG. 2 shows a flow chart of the automatic telephone answering apparatus of this embodiment. The MPU 15 operates in accordance with the flow chart shown in FIG. 2.

This operation is executed after turn-on of the automatic telephone answering apparatus and when the mode switch 16 is turned to a non-automatic mode from the automatic answering mode. Moreover, it is assumed that the counter memory 12 of the MPU 15 has stored the count value of the end tape position of serially recorded messages. The count value is obtained by an ICM tape counter 11 responsive to tape position signal from the second tape recorder 10b in accordance with a well-known process (not shown).

Processing starts at step S1 where the MPU 15 detects a condition of the hook switch 4b and makes a decision as to whether the hook switch 4b is OFF (OFF-HOOK) or ON (ON-HOOK). If the hook switch 4b is in OFF (YES), processing proceeds to step S10. If the hook switch 4b is in ON (NO), processing proceeds to step S2. In step S2, the MPU 15 makes a decision as to whether the tape recorder 10b is being operated or not. If NO, processing returns to step S1 and loops until the tape recorder 10b is operated or the hook switch is in OFF. In step S1, the answer is YES, i.e., the hook switch is turned to OFF, processing proceeds to step S10 where a decision is made as to whether a record switch for causing the recorder 10b to be in the recording mode is turn on. IF YES, the MPU 15 produces a command signal at step S11 for recording a conversation between the operator and his conversation partner by the tape recorder 10b. Then, processing returns to step S1. In step S10, if the answer is NO, processing returns to step S1 directly.

Here, operation in connection with the ICM tape 9 will be described. The ICM tape 9 is reproduced in response to turn-on of a message reproduction switch (not shown) of the operation unit 14. When the MPU 15 detects the turn-on of the message reproduction switch, the MPU 15 produces a command signal of rewinding of ICM tape 9 at first. During rewinding, the ICM tape counter 11 carries out down-counting. When the MPU 15 detects the beginning of the ICM tape 9 by stop of the down-counting, it switches the second tape recorder 10b to a reproducing mode. Then, the automatic telephone answering apparatus reproduces messages recorded in the ICM tape 9 from the speaker 17 through the selection circuit 7 and the output amplifier of the input/output amplifier 6. During reproduction, the tape counter 11 carries out up-counting and the MPU 15 compares the present count with the stored counting value of messages. If the present count value is the same as the stored value, the MPU 15 produces a command signal of stopping of reproduction to the second tape recorder 10b. This sequence is reproduction of the ICM tape 9.

When the MPU 15 detects the turn-on of the rewinding switch of the operation unit 14, the MPU 15 produces a command signal of rewinding of tile ICM tape 9. During rewinding, the ICM tape counter 11 carries out down-counting. When the MPU 15 detects the beginning of the ICM tape 9 by stop of the down-counting, it stops rewinding operation. This sequence is rewinding operation of ICM tape 9.

Operation when OFF-HOOK is detected by the MPU 15 in the reproduction and rewinding operations will be described with reference to FIG. 2. In step S2, if the answer is YES, processing proceeds to step S3. In step S3, the MPU 15 detects whether the hook switch 4a is in OFF. If NO, processing returns to step S2. If YES, processing proceeds to step S4.

In step S4, a decision is made as to whether the ICM tape 9 is being rewound. If YES, processing proceeds to step S5. In step S5, a decision is made as to whether the rewinding is previously performed for production. If NO, processing proceeds to step S6 where the MPU 15 stops rewinding when the beginning of the ICM tape is detected. Then, processing returns to step S1. In step S5, if the answer is YES, processing advances to step S8 where the MPU 15 produces a command signal for winding the ICM tape 9 in fast-forward direction to the end position of the serially recorded messages with reference to the stored counting value. Then, processing returns to step S1. In step S4, if the answer is NO, processing proceeds to step S7 where the MPU 15 makes a decision as to whether the present tape position value is larger than the stored counting value, i.e., the end position of messages. If, the present tape position value is larger than the stored counting value, processing proceeds to step S9 where the MPU 15 produces a command signal of stopping the second tape recorder 10b. In step S7, when the present value is not larger than the stored counting value, processing advances to step S8 where the MPU 15 carries fast-forward winding of the ICM tape 9 to the tape end position of the serially recorded messages.

In steps S7 and S9, if the present tape position is larger than the stored counting value, the tape recorder 10b is stopped immediately because there is no possibility that the recorded messages are erased.

After processing of steps S6, S8 and S9, when the record switch is in ON, the MPU 15 produces a command signal of recording to the recorder 10b and switches the interface circuit 2, the voice signal amplifier 5, and the tape selection circuit 7 to record the conversation, in step S11.

In the above-mentioned embodiment, various decisions are made before tape positioning to the end of message. However, there is another embodiment where operation is simplified. In FIG. 2, if the answer is NO, in step S1, processing can proceed to step S7 directly. In other words, steps 2–6 can be omitted. On the other hand, steps S1, S7, S8, S9, S10, and S11 are left.

Operation of the above-mentioned another embodiment will be described.

In step S1, OFF-HOOK action is detected by the MPU 5. If the answer is NO, processing directly proceeds to step S7 where the MPU 15 makes a decision as to whether the present tape position is larger than the stored counter value, i.e., end position of messages. If, the present tape position is larger than the stored counter value, processing proceeds to step S9 where the MPU 15 produces a command signal of stopping the tape recorder 10b. In step S7, the present value is not larger than the stored value, processing advances to step S8 where the MPU 15 carries out fast-forward winding of the ICM tape 9.

In steps S7 and S9, if the present tape position is larger than the stored counting value, the cassette deck 10 is stopped immediately because there is no possibility that the recorded messages are erased.

After processing of steps S6, S8 and S9, the MPU 15 produces a command signal of recording to the tape recorder 10b and switches over the interface circuit 2, the voice signal amplifier 5, and the tape selection circuit 7 to record the voice signal from the telephone line 1, in step S11.

In the above-mentioned embodiment, the automatic telephone answering apparatus is described as an automatic answering apparatus built in a telephone apparatus. However, the automatic answering apparatus and the telephone apparatus may be provided separately and connected to the same telephone line. In such case, OFF-HOOK of the telephone can be detected by a voltage drop of the telephone line.

Moreover, tape-positioning is carried out when Off-HOOk is detected when the tape recorder 10b is operated. However, it is essentially sufficient that the MPU 15 prevents the automatic telephone answering apparatus from recording a message over the recorded message when start of communication is detected. Further, tape-positioning is carried out when ON-HOOK is detected during the tape recorder 10b is operated. Moreover if a hand-free communication mode is provided, the tape-positioning is carried out in response to the hand-free communication key. Moreover, the ring signal can be used for start of tape-positioning. That is, if the ring signal is received while the ICM tape 9 is being rewound, i.e., when a change in the telephone line is detected, tape-positioning can be executed. Further, the tape-positioning is also carried out when the loop current is detected because a loop current flows in the telephone line in the OFF-HOOK condition.

Hereinbelow will be described a second embodiment of an automatic telephone answering apparatus of this invention.

Figure 3:
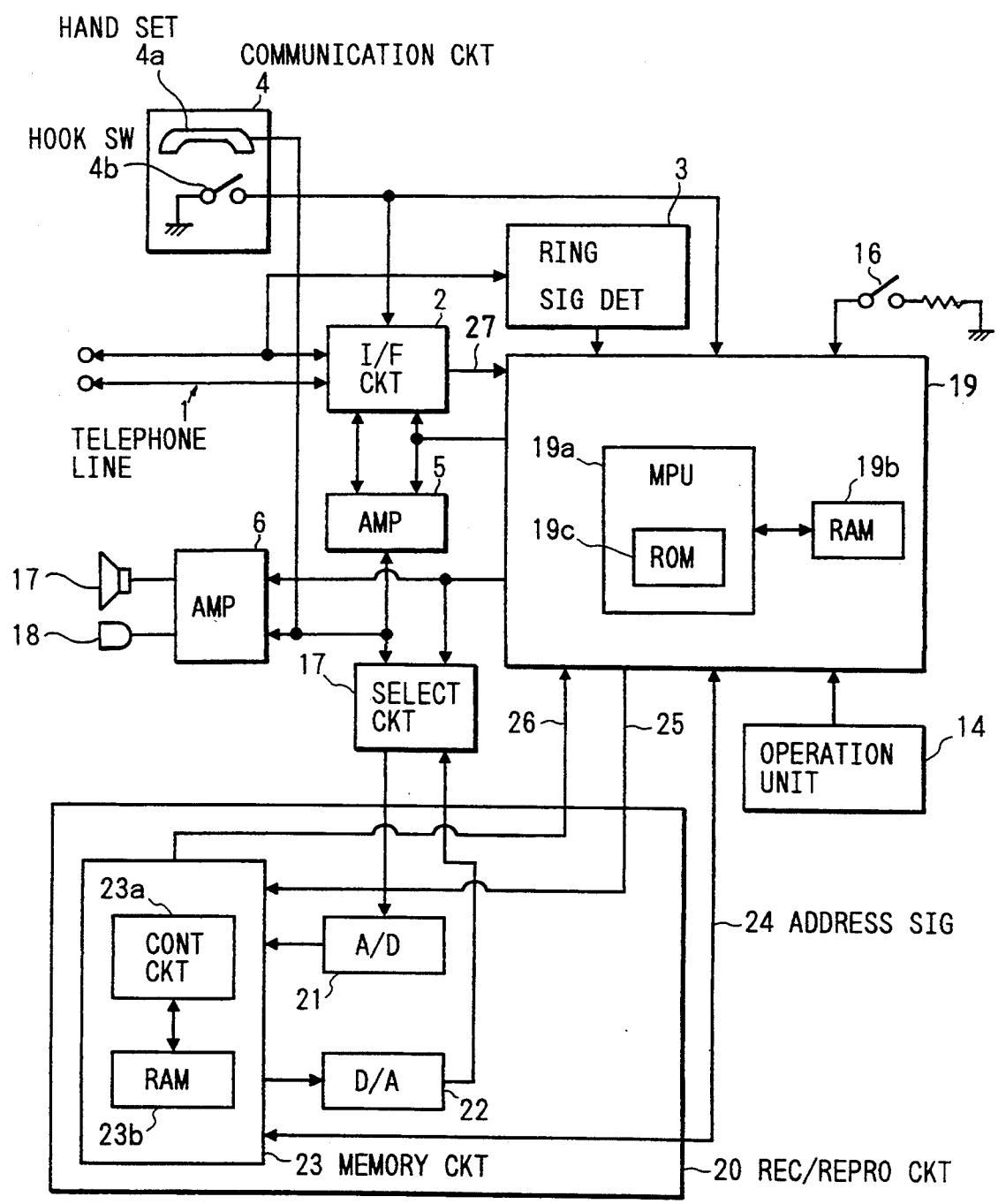
FIG. 3 is a block diagram of the second embodiment of the automatic telephone answering apparatus.

FIG. 3 is a block diagram of the second embodiment of the automatic telephone answering apparatus. The structure of the second embodiment is basically the same as that of the first embodiment. That is, circuits for receiving and sending messages are the same as those of the first embodiment. The difference is in circuits for recording and reproducing messages and controlling of these circuits.

A control circuit (microprocessor) 19 comprises a microprocessor (MPU) 19a, and a random access memory (RAM) 19b for storing address data for recording and reproducing. The MPU 19a includes a ROM 19c for storing a program for operating processes of recording and reproducing in addition to the basic receiving and sending operation mentioned in the first embodiment. A recording/reproducing circuit 20 comprises a memory circuit 23 including a RAM 23b and a memory control circuit 23a, and an a/d converter 21 for converting the analog voice signal from the voice signal amplifier 5 or the output/input amplifying unit 6 into a digital voice signal, and a d/a converter 22 for converting a digital voice signal read out from the memory circuit 23 is converted into an analog voice signal. A selection circuit 17 comprises a switch circuit for making either a signal passage between the a/d converter 21 and the voice signal amplifier 5 or the output/input amplifying unit 6 or a signal passage between tile d/a converter 22 and the voice signal amplifier 5 or the output/input amplifying unit 6 in response to the control signal from the control circuit 19. The memory circuit 23 stores or reads the digital voice signal in response to a memory control signal 25 using address signal 24. The memory control signal 25 is supplied by the control circuit 19 for indicating recording, reproducing, or stopping.

Figure 4:
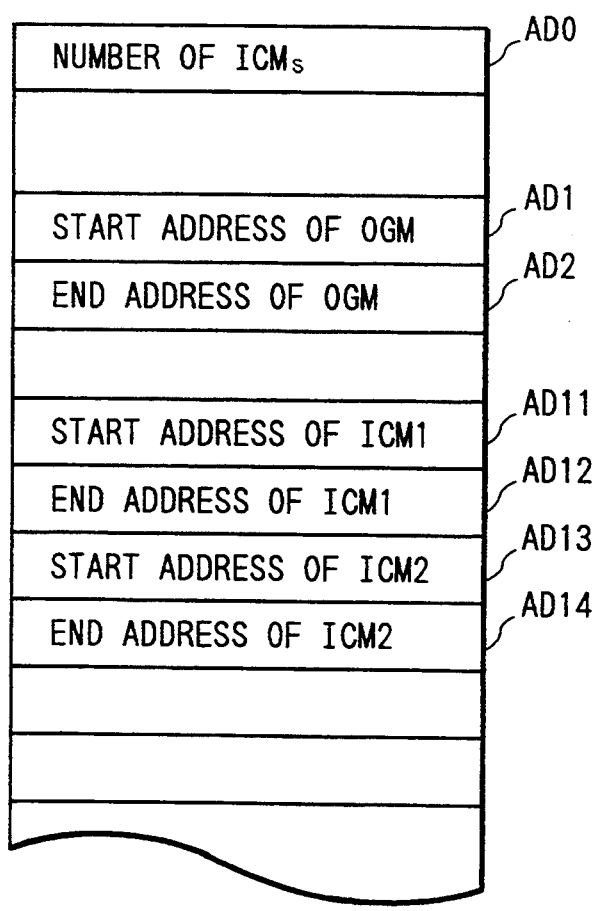
FIG. 4 shows a memory map of a RAM of the second embodiment.

FIG. 4 shows a memory map of the RAM 19b of the second embodiment. The RAM 19b stores a start address data of an out-going message (OGM) at an address AD1 and an end address data of the OGM at the following address AD2. Start address data of an incoming message ICM1 is stored at an address at AD11 and end address data of the incoming message ICM1 is stored at the following address AD12. Start address data of an incoming message ICM2 is stored at an address at AD13 and end address data of the incoming message ICM2 is stored at the following address AD14. In this example, a set of addresses of two incoming messages ICM1 and ICM2 are stored. However, the number of sets of addresses of incoming messages are increased by storing a set of start address data and end address data at the addresses following to the last address where end address data of the incoming message is recently stored. The control circuit 19 recognizes the last address by storing the number of sets of the incoming messages recorded by storing the number of incoming messages stored in the RAM 19b at an address AD0 in the RAM 19b.

In recording mode, the memory circuit 23 stores the digital voice signal from the a/d converter 21 at the RAM 23b in the memory circuit 23 in accordance with the address signal 24 when the memory control signal 25 is indicative of recording. For example, on recording of an incoming message ICM1, the control circuit 19 reads the start address of ICM1 at the address AD11 which is stored in the initializing processing (not shown) of the control circuit 19 and produces the address signal 24 indicative of the address AD11. Then, tile control circuit 19 supplies the memory control signal 25 indicative of recording to the memory circuit 23. In response to this, the memory circuit 23 starts to record a digital voice signal from the a/d converter 21. This digital voice signal is derived from the caller via the interface circuit 2, the voice signal amplifier 5, and the selection circuit 17. When the control circuit 19 detects a termination of the incoming message by checking the line status signal 27 from the interface circuit 2, the control circuit 19 supplies the memory control signal 25 indicative of stopping the recording. In response to this, the memory circuit 23 stops recording and supplies end address data of the incoming message ICM1 to the control circuit 19 as the address signal 24. Then, the control circuit 19 stores the end address data of the incoming message ICM1 in the RAM 19b at the address AD12. The control circuit 19 reads the number of the incoming messages which have been stored in the RAM 19b at the address AD0, adds one to the read number, and stores it the RAM 19b at the address AD0 again. Therefore, the control circuit 19 can recognize the recently stored end address of an incoming message. An out-going message is stored similarly and a start address and an end address are stored at addresses AD1 and AD2 respectively.

In the reproducing mode, the control circuit 19 supplies the address signal 24 indicative of a start address of one of incoming messages and the memory control signal 25 indicative of reproducing to the memory circuit 23. Then, the memory circuit 23 starts of reading the RAM 23b thereof in accordance with the supplied address signal 24. Then, the control circuit 19 reads an end address of the incoming message and supplies the end address as the address signal 24. The memory circuit 23 ends the reading the data of the incoming message when an address signal for the RAM 23b agrees with the supplied end address and then, supplies an end signal 26 to the control circuit 19.

In the automatic answering mode, that is, when the mode switch 16 is turned to the automatic answering mode, in response to a call, namely, a ring detection signal from the ring signal detection circuit 3, the control circuit 19 sends the out-going message recorded by supplying the memory control signal 25 and the address signal 24 to the memory circuit 23, and after sending the out-going message, records an in-coming message by supplying the memory control signal 25 and the address signal 24 to the memory circuit 23 as similar to the first embodiment.

In the non-automatic answering mode that is, when the mode switch 16 is turned to the non-automatic answering mode, the operator can record an out-going message and a communication with a caller and can reproduce recorded incoming messages by operating the operation unit 14. More specifically, when the operator records a new out-going message by operating an out-going message recording switch (not shown) in the operation unit 14, the control circuit 19 supplies the memory control signal 25 and the address signal 24 indicative of the start address of the out-going message which has been stored in the initializing processing to the memory circuit 23. In response to this the memory circuit 23 starts recording of the out-going message. When the operator stops the recording by operating the out-going message recording switch again, the control circuit supplies the memory control signal 25 indicative of stopping to the memory circuit 23. In response to this, the memory circuit 23 stops the recording and supplies the address signal 24 indicative of an end address of the recorded out-going message. The control circuit stores this end address at an address AD2 in the RAM 19b.

In the non-automatic answering mode, if the operator reproduces the recorded incoming messages by operating a reproducing switch (not shown) in the operation unit 14, the control circuit 19 supplies the memory control signal 25 indicative of reproducing and the address signal 24 indicative of the start and end addresses of the incoming message stored in the automatic recording mode. In response to this the memory circuit 23 starts reproducing of one incoming message. When the incoming message has been read out, the memory circuit 23 supplies the end signal 26 to the control circuit 19. In response to the end signal 26, the control circuit 19 supplies the memory control signal 25 indicative of reproducing and the address signal 24 indicative of the start and end addresses of the next incoming message stored in the automatic recording mode. In response to this the memory circuit 23 continues reproducing of the following incoming message. When the operator stops the reproducing by operating the incoming message reproducing switch again, the control circuit 19 supplies the memory control signal 25 indicative of stopping to the memory circuit 23. In response to this, the memory circuit 23 stops the reproducing.

In this embodiment, when the memory circuit 23 is operated and a call reaches this automatic telephone answering apparatus in the non-automatic answering mode, the control circuit 19 can record a communication with a caller in response to a recording switch (not shown) in the operation unit 14.

Figure 5:
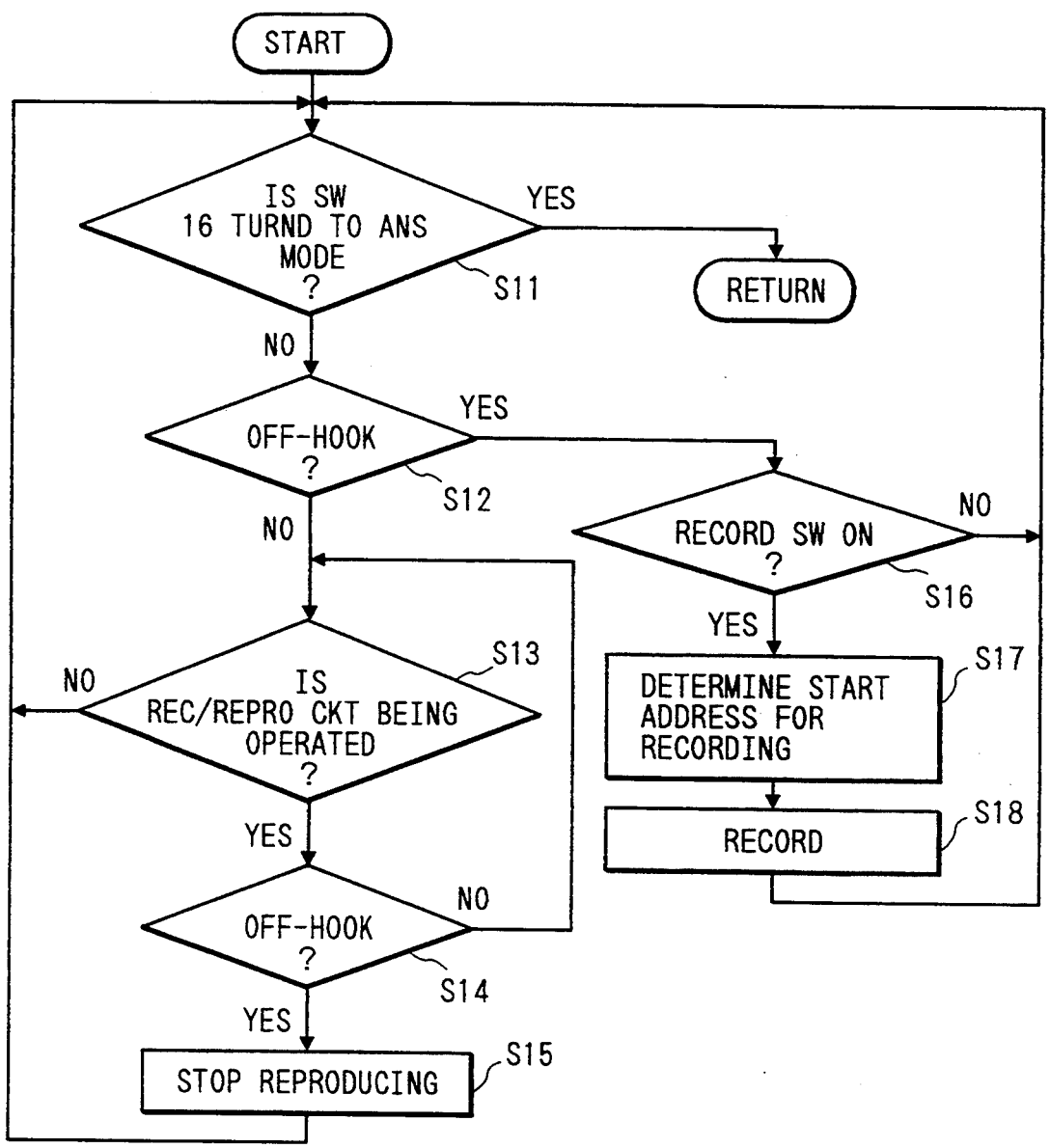
FIG. 5 shows a flow chart of the second embodiment

This operation will be described with reference to FIG. 5. FIG. 5 shows a flow chart of the second embodiment The control circuit 19 moves to this operation from a main operation program for controlling the basic functions of the automatic telephone answering apparatus when the mode switch 16 is turned to a non-automatic mode from the automatic answering mode. Moreover, it is assumed that some incoming messages have been stored and thus, the number of recorded incoming messages are stored in the RAM 19b at the address AD0.

Processing starts at step S11 where the control circuit 19 detects the switch 16 to make a decision as to whether or not the switch 16 is turned on the automatic answering mode. If YES, that is, the switch 16 is turned on the automatic answering mode, processing returns to the main program. If NO, that is, the switch 16 is still in the non-automatic answering mode, processing proceeds to step S12. In step S12, the control circuit 19 detects a condition of the hook switch 4b and makes a decision as to whether the hook switch 4b is OFF (OFF-HOOK) or ON (ON-HOOK). If the hook switch 4b is in OFF (YES), processing proceeds to step S16. If the hook switch 4b is in ON (NO), processing proceeds to step S13. In step S13, the control circuit 19 makes a decision as to whether or not the recording/reproducing circuit 20 is being operated, namely in a reproducing or a recording condition. If NO, processing returns to step S11 and loops until the recording/reproducing circuit 20 is operated, that is, the hook switch is turned to OFF, or the switch 16 is turned to the automatic answering mode.

In step S13, when the answer is YES, that is, the recording/reproducing circuit is being operated, namely, in a recording or a reproducing condition, processing proceeds to step S14. In step S14, the control circuit 19 detects a condition of the hook switch 4b and makes a decision as to whether the hook switch 4b is OFF (OFF-HOOK) or ON (ON-HOOK). If the hook switch 4b is in ON (NO), processing returns to step S13. If the hook switch 4b is in OFF (YES), processing proceeds to step S15. In step S15, the control circuit 19 supplies tile memory control signal 25 indicative of stopping to the memory circuit 23. That is, if the recording/reproducing circuit 20 is being operated in the non-automatic answering mode, the a call reaches this apparatus, and tile hook switch is turned OFF, the control circuit 19 stops the operation of the recording/reproducing circuit 20. Then, in this condition, processing proceeds to step S16 via steps S11, and S12.

In step S16 the control circuit makes a decision as to whether or not the record switch is turned on. If the record switch is not turned on, processing returns to step S11. If tile record switch is turned on, processing returns to step S17. In step S17, the control circuit 19 determine a start address for recording communication between the called person (operator) and the caller by the data of the number of the incoming messages which has been recorded in the RAM 19b at address AD0 and the last end address indicated by the data stored the address AD0. In the following step S18, the control circuit 19 produces the memory control signal indicative of recording to record a conversation between the operator and his conversation partner in the RAM 23b in the memory circuit 22 in step S18. Then, processing returns to step S11. In step S18, when the control circuit 19 detects ON-HOOK or operation of a stop switch (not shown) in the operation unit 14, processing returns to step S11.

As described above, in the non-automatic answering mode, a conversation between the operator and the caller can be recorded though a call reaches the automatic telephone answering apparatus while the recording/reproducing circuit 20 is operated.

In the above-mentioned embodiments, incoming messages and the conversation are recorded serially or successively in the RAM of the memory circuit 23. However, the digital voice signal from the a/d converter may be stored such that it is recorded on an empty area of the RAM of the memory circuit 23 which is detected by the memory control circuit 23a. Such technique is well-known as a memory controlling technique. Moreover, in step S12, the decision is made in accordance with the condition of the hook switch 4b. However, this decision may be made in response to other signals indicative of a status (line status) of the telephone line 1, namely, the detected ring signal from the ring signal detection circuit 3. Further, a decision in steps s16 and s13 can be omitted, that is, entrance of the processing in step 17 can be made in response to the off-hook condition or the detected ring signal. Moreover, the line status can be detected by a hook switch of a telephone connected to the telephone line 1 in parallel to the automatic telephone answering apparatus or decrease in the decrease in voltage between the lines of the telephone line as described in the following modified embodiments.

Figure 6:
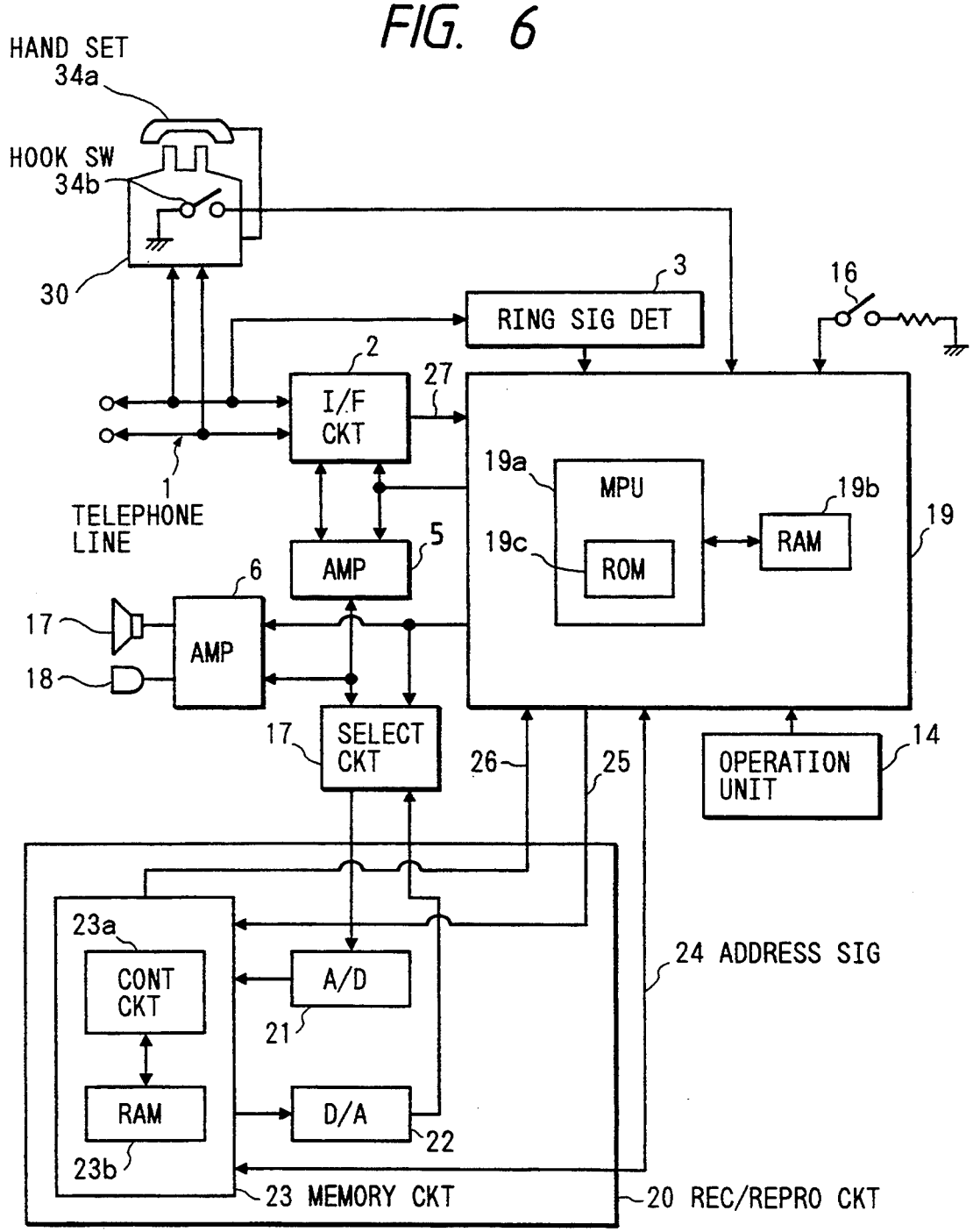
FIG. 6 is a block diagram of a first modified embodiment of the second embodiment.

FIG. 6 is a block diagram of a first modified embodiment of the second embodiment. In FIG. 6, a telephone 30 is separately provided from the automatic telephone answering apparatus. Therefore, the automatic telephone answering apparatus shown in FIG. 6 has no handset. The telephone 30 is connected to the telephone line in parallel to the automatic telephone answering apparatus. A hook switch 34b of the telephone 30 supplies an off-hook signal to the control circuit 19 when a handset 34a is lifted. Other structure and operation are the same as the second embodiment.

Figure 7:
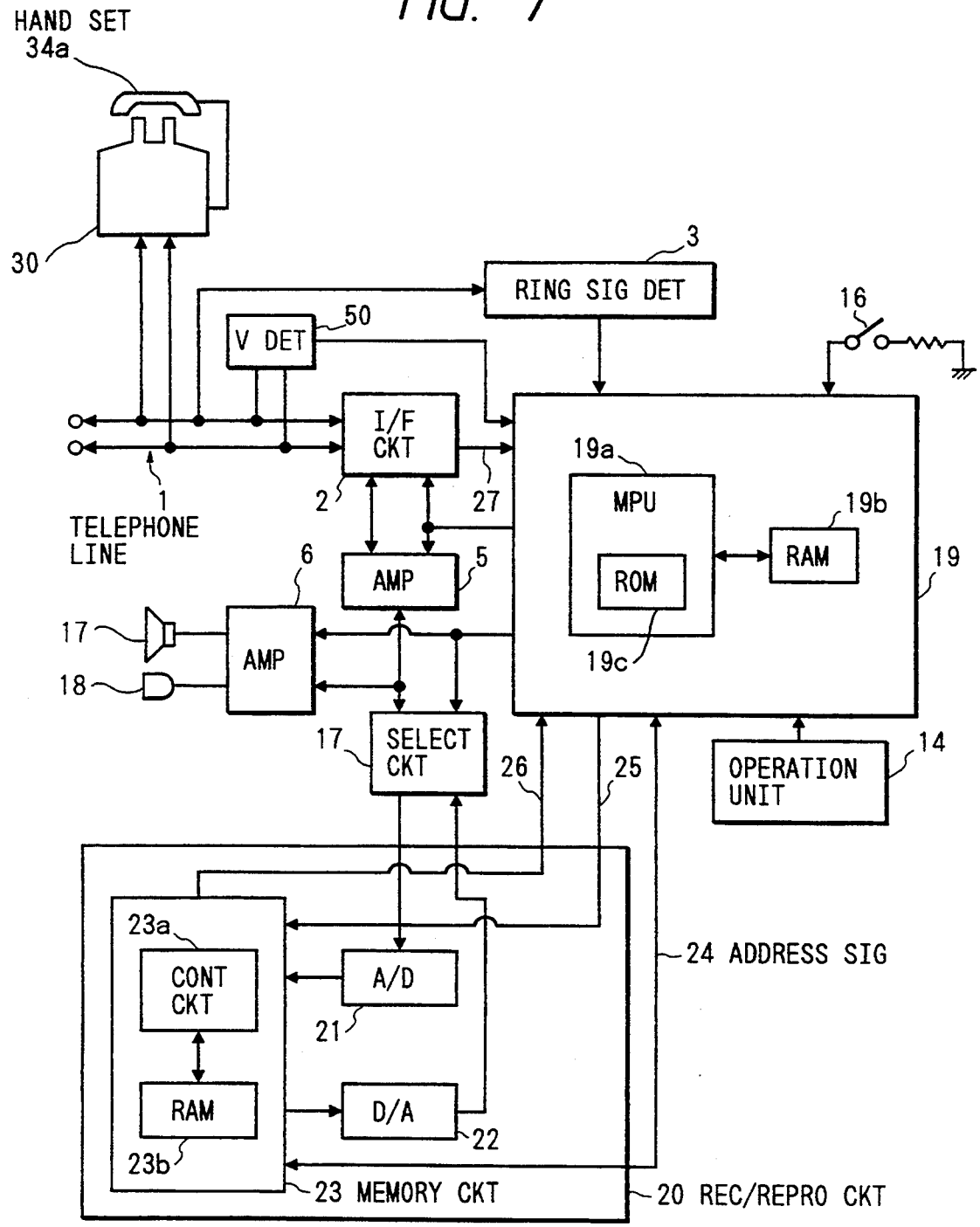
FIG. 7 is a block diagram of a second modified embodiment of the second embodiment.

FIG. 7 is a block diagram of a second modified embodiment of the second embodiment. In FIG. 7, the telephone 30 is separately provided from the automatic telephone answering apparatus which includes no handset. The telephone 30 is connected to the telephone line in parallel to the automatic telephone answering apparatus. An off-hook condition is detected by decrease in a voltage between lines of the telephone line 1 with a voltage decrease detection circuit 50 when a handset 34a is lifted. Other structure and operation are the same as the second embodiment.

In the above mentioned second embodiment and first and second modified embodiments, the status of the telephone lines is directly detected by the voltage decrease detector 50, the ring signal detection circuit 3, the interface circuit 2 (line status signal 27). However, the status of the telephone line is also detected by the hook switch 4b shown in FIGS. 1 and 3, and the hook switch 34b shown in FIG. 6.

What is claimed is:

1. An automatic telephone answering apparatus for sending an outgoing message recorded in first storing means through a telephone line and recording incoming messages in second storing means, said automatic telephone answering apparatus further having a further mode for recording a conversation between an operator and a conversation partner, comprising:

reproducing means response to a reproducing command signal for reproducing one of incoming messages from said second storing means;

line status detection means for detecting a line status of said telephone line;

first control means responsive to said second storing means for detecting an area of said second storing means where said incoming messages is stored and for storing data indicative of said area;

second control means for detecting an empty area of said second storing means in accordance with said storing data;

third control means responsive to said line status detection means for effecting a predetermined preparation operation when said line status detection means detects a start of use of said telephone line in order to make it possible to record said conversation between said operator and said conversation partner on said second storing means by causing said second control means to detect said empty area; and fourth control means responsive to said third control means and a recording command signal for effecting said further mode.

2. An automatic telephone answering apparatus as claimed in claim 1, further comprising:

reproducing detection means responsive to said reproducing means for detecting a reproducing condition of said reproducing means, said third control means effecting said preparation operation by causing said reproducing means to stop the reproducing of said one of said stored incoming messages when said reproducing detection means detects said reproducing condition and said line status detection means detects said start of use of said telephone line.

3. An automatic telephone answering apparatus as claimed in claim 1, further comprising:

(a) out-going message recording means responsive to an out-going message command signal for inputting and storing said out-going message into said first storing means; and (b) recording detection means responsive to said recording means for detecting a recording condition of said out-going message recording means, said third control means effecting said preparation operation by causing said out-going message recording means to stop said recording of said out-going message when said recording detection means detects said recording condition and said line status detection means detects said start of use of said telephone line.

4. An automatic telephone answering apparatus as claimed in claim 1, further comprising a handset for communicating with said telephone line, said line status detection means comprising an off-hook switch actuated by said handset for detecting an off hook condition of said automatic telephone answering apparatus.

5. An automatic telephone answering apparatus as claimed in claim 1, wherein said line status detection means comprises ring signal detection means for detecting a ring signal sent from said telephone line.

6. An automatic telephone answering apparatus as claimed in claim 1, further comprising off-hook detection means for detecting an off-hook condition of a telephone connected to said telephone line in parallel.

7. An automatic telephone answering apparatus as claimed in claim 6, wherein said off-hook detection means comprises voltage-decrease detection means for detecting said off-hook condition by detection of decrease in a voltage between lines of said telephone line.

8. An automatic telephone answering apparatus as claimed in claim 6, wherein said off-hook detection means comprises receiving means for receiving an off-hook signal from an off-hook switch included in said telephone.

9. An automatic telephone answering apparatus as claimed in claim 1, wherein said second storing means comprises a semiconductor memory, an a/d converter for converting a voice signal indicative of said incoming message and said conversation to a digital voice signal, a semiconductor memory for storing and reading said digital voice signal, and a d/a converter for converting read digital voice signal to an analog voice signal.

10. An automatic telephone answering apparatus as claimed in claim 1, further comprising out-going message recording means responsive to an out-going message command signal for inputting and storing said out-going message into said first storing means, said first storing means having:

(a) a semiconductor memory;
(b) an a/d converter for converting a voice signal indicative of said incoming message and said conversation to a digital voice signal;
(c) a semiconductor memory for storing and reading said digital voice signal; and
(d) a d/a converter for converting read digital voice signal to an analog voice signal.

11. An automatic telephone answering apparatus for sending an out-going message recorded in first storing means through a telephone line and recording incoming messages in second storing means, said automatic telephone answering apparatus further having a further mode for recording a conversation between an operator and a conversation partner, said second storing means storing one of said incoming messages and said conversation in response to first address signal, said second storing means reading one of said incoming messages and said conversation in response to second address signal, comprising:

(a) first control means responsive to said second storing means for detecting an area of said second storing means where said incoming messages are stored and for storing data indicative of said area;

(b) second control means for detecting an empty area of said second storing means in accordance with said stored data;

(c) reproducing means responsive to a reproducing command signal for supplying said second address signal to said second storing means in accordance with said stored data, for causing said second storing means to read said stored one of said incoming messages with said supplied second address signal, and for reproducing said read one of said incoming messages;

(d) line status detection means for detecting a line status of said telephone line;

(e) third control means responsive to said line status detection means for causing said second control means to detect said empty area when said line status detection means detects a start of use of said telephone line and for supplying said first address signal in accordance with said detected empty area to said second storing means in order to store said conversation with said supplied first address signal by said second storing means; and (f) fourth control means responsive to a recording command signal and said third control means for effecting said further mode using said first address signal.

12. An automatic telephone answering apparatus as claimed in claim 11, further comprising a handset for communicating with said telephone line, said line status detection means comprising an off-hook switch actuated said handset for detecting an off hook condition of said automatic telephone answering apparatus.

13. An automatic telephone answering apparatus as claimed in claim 11, wherein said line status detection means comprises ring signal detection means for detecting a ring signal sent from said telephone line.

14. An automatic telephone answering apparatus as claimed in claim 11, further comprising off-hook detection means for detecting an off-hook condition of a telephone connected to said telephone line in parallel.

15. An automatic telephone answering apparatus as claimed in claim 14, wherein said off-hook detection means comprises voltage decrease detection means for detecting said off-hook condition by detection of decrease in a voltage between lines of said telephone line.

16. An automatic telephone answering apparatus as claimed in claim 14, wherein said off-hook detection means comprises receiving means for receiving an off-hook signal from an off-hook switch included in said telephone.

17. An automatic telephone answering apparatus as claimed in claim 11, wherein said second storing means comprises a semiconductor memory, an a/d converter for converting a voice signal indicative of said incoming message and said conversation to a digital voice signal, a semiconductor memory for storing and reading said digital voice signal, and a d/a converter for converting read digital voice signal to an analog voice signal.

18. An automatic telephone answering apparatus as claimed in claim 11, further comprising out-going message recording means responsive to an out-going message command signal for inputting and storing said out-going message into said first storing means, said first storing means having:

(a) a semiconductor memory;

(b) an a/d converter for converting a voice signal indicative of said incoming message and said conversation to a digital voice signal;

(c) a semiconductor memory for storing and reading said digital voice signal; and (d) a d/a converter for converting read digital voice signal to an analog voice signal.

19. An automatic telephone answering apparatus for sending an out-going message recorded in first storing means through a telephone line and recording incoming messages in second storing means in an automatic answering mode, said automatic telephone answering apparatus further having a further mode for recording a conversation between an operator and a conversation partner in a non-automatic answering mode, comprising:

(a) line status detection means for detecting a line status of said telephone line;

(b) a switch responsive to a manual operation for producing a mode signal indicative of either of said automatic answering mode and said non-automatic answering mode;

(c) control means responsive to said line status detection means and said mode signal for causing said second control means to detect said empty area in said non-automatic answering mode when said line status detection means detects a start of use of said telephone line in order to store said conversation in said second storing means at said detected empty area; and (d) means responsive to a recording command signal and said control means for effecting said further mode to record said conversation at said empty area.

20. An automatic telephone answering apparatus as claimed in claim 19, further comprising:

(a) second control means responsive to said second storing means for detecting an area of said second storing means where said incoming messages are stored and for storing data indicative of said area; and (b) third control means for detecting an empty area of said second storing means in accordance with said stored data, said control means effects said preparation operation by causing said third control means to detect said empty area.

21. An automatic telephone answering apparatus as claimed in claim 19, further comprising:

(a) reproducing means response to a reproducing command signal for reproducing one of said stored incoming messages in said non-automatic answering mode; and (b) reproducing detection means responsive to said reproducing means for detecting a reproducing condition of said reproducing means, said control means effecting said preparation operation by causing said reproducing means to stop the reproducing of said one of said stored incoming messages when said reproducing detection means detects said reproducing condition and said line status detection means detects said start of use of said telephone line.

22. An automatic telephone answering apparatus as claimed in claim 19, further comprising:

(a) out-going message recording means responsive to an out-going message command signal for inputting and storing said out-going message into said first storing means in said non-automatic answering mode; and (b) recording detection means responsive to said recording means for detecting a recording condition of said out-going message recording means, said first mentioned control means effecting said preparation operation by causing said out-going message recording means to stop said recording of said out-going message when said recording detection means detects said recording condition and said line status detection means detects said start of use of said telephone line.

23. An automatic telephone answering apparatus as claimed in claim 19, further comprising a handset for communicating with said telephone line, said line status detection means comprising an off-hook switch actuated said handset for detecting off hook condition of said automatic telephone answering apparatus.

24. An automatic telephone answering apparatus as claimed in claim 19, wherein said line status detection means comprises ring signal detection means for detecting a ring signal sent from said telephone line.

25. An automatic telephone answering apparatus as claimed in claim 19, further comprising off-hook detection means for detecting an off-hook condition of a telephone connected to said telephone line in parallel.

26. An automatic telephone answering apparatus as claimed in claim 25, wherein said off-hook detection means comprises voltage decrease detection means for detecting said off-hook condition by detection of decrease in a voltage between lines of said telephone line.

27. An automatic telephone answering apparatus as claimed in claim 25, wherein said off-hook detection means comprises receiving means for receiving an off-hook signal from an off-hook switch included in said telephone.

28. An automatic telephone answering apparatus as claimed in claim 19, wherein said second storing means comprises a semiconductor memory, an a/d converter for converting a voice signal indicative of said incoming message and said conversation to a digital voice signal, a semiconductor memory for storing and reading said digital voice signal, and a d/a converter for converting read digital voice signal to an analog voice signal.

29. An automatic telephone answering apparatus as claimed in claim 19, further comprising out-going message recording means responsive to an out-going message command signal for inputting and storing said out-going message into said first storing means, said first storing means having:

(a) a semiconductor memory;
(b) an a/d converter for converting a voice signal indicative of said incoming message and said conversation to a digital voice signal;
(c) a semiconductor memory for storing and reading said digital voice signal; and
(d) a d/a converter for converting read digital voice signal to an analog voice signal.

30. An automatic telephone answering apparatus for sending an out-going message recorded in first storing means through a telephone line and recording incoming messages in second storing means in an automatic answering mode, said automatic telephone answering apparatus further having a further mode for recording a conversation between an operator and a conversation partner in a non-automatic answering mode, said second storing means storing one of said incoming messages and said conversation in response to first address signal, said second storing means reading one of said incoming messages and said conversation in response to second address signal, comprising:

(a) first control means responsive to said second storing means for detecting an area of said second storing means where said incoming messages are stored and for storing data indicative of said area;
(b) second control means for detecting an empty area of said second storing means in accordance with said stored data;
(c) reproducing means responsive to a reproducing command signal for supplying said second address signal to said second storing means in accordance with said stored data, for causing said second storing means to read said stored one of said incoming messages with said supplied second address signal, and for reproducing said read one of said incoming messages;
(d) line status detection means for detecting a line status of said telephone line; and
(e) a switch responsive to a manual operation for producing a mode signal indicative of either of said automatic answering mode and said non-automatic answering mode;
(f) third control means responsive to said line status detection means for causing said second means to detect said empty area in said non-automatic answering mode when said line status detection means detects a start of use of said telephone line and for supplying said first address signal in accordance with said detected empty area to said second storing means in order to cause said second storing means to store said conversation with said supplied first address signal; and
(g) means responsive to a recording command signal and said third control means for effecting said further mode using said first address signal.

31. An automatic telephone answering apparatus as claimed in claim 30, further comprising a handset for communicating with said telephone line, said line status detection means comprising an off-hook switch actuated said handset for detecting off hook condition of said automatic telephone answering apparatus.

32. An automatic telephone answering apparatus as claimed in claim 30, wherein said line status detection means comprises ring signal detection means for detecting a ring signal sent from said telephone line.

33. An automatic telephone answering apparatus as claimed in claim 30, further comprising off-hook detection means for detecting an off-hook condition of a telephone connected to said telephone line in parallel.

34. An automatic telephone answering apparatus as claimed in claim 33, wherein said off-hook detection means comprises voltage decrease detection means for detecting said off-hook condition by detection of decrease in a voltage between lines of said telephone line.

35. An automatic telephone answering apparatus as claimed in claim 33 wherein said off-hook detection means comprises receiving means for receiving an off-hook signal from an off-hook switch included in said telephone.

36. An automatic telephone answering apparatus as claimed in claim 33, wherein said second storing means comprises a semiconductor memory, an a/d converter for converting a voice signal indicative of said incoming message and said conversation to a digital voice signal, a semiconductor memory for storing and reading said digital voice signal, and a d/a converter for converting read digital voice signal to an analog voice signal.

37. An automatic telephone answering apparatus as claimed in claim 33, further comprising out-going message recording means responsive to an out-going message command signal for inputting and storing said out-going message into said first storing means, said first storing means having:
  (a) a semiconductor memory;
  (b) an a/d converter for converting a voice signal indicative of said incoming message and said conversation to a digital voice signal;
  (c) a semiconductor memory for storing and reading said digital voice signal; and
  (d) a d/a converter for converting read digital voice signal to an analog voice signal.

38. An automatic telephone answering apparatus for sending an out-going message recorded in first storing means through a telephone line and recording incoming messages in second storing means, said telephone answering apparatus further having a further mode for recording a conversation between an operator and a conversation partner, comprising:
  (a) first control means responsive to said second storing means for detecting an area of said second storing means where said incoming messages is stored and for storing data indicative of said area;
  (b) second control means for detecting an empty area of said second storing means in accordance with said data;
  (c) line status detection means for detecting a line status of said telephone line;
  (d) third control means responsive to said line status detection means for causing said second control means to detect said empty area when said line status detection means detects a start of use of said telephone line; and
  (e) fourth control means responsive to a recording command signal and said third control means for storing said conversation in said second storing means at said detected empty area when said recording command signal indicates said recording of said conversation.

39. An automatic telephone answering apparatus as claimed in claim 38, further comprising a handset for communicating with said telephone line, said line status detection means comprising an off-hook switch actuated said handset for detecting off hook condition of said automatic telephone answering apparatus.

40. An automatic telephone answering apparatus as claimed in claim 38, wherein said line status detection means comprises ring signal detection means for detecting a ring signal sent from said telephone line.

41. An automatic telephone answering apparatus as claimed in claim 38, further comprising off-hook detection means for detecting an off-hook condition of a telephone connected to said telephone line in parallel.

42. An automatic telephone answering apparatus as claimed in claim 41, wherein said off-hook detection means comprises voltage decrease detection means for detecting said off-hook condition by detection of decrease in a voltage between lines of said telephone line.

43. An automatic telephone answering apparatus as claimed in claim 41, wherein said off-hook detection means comprises receiving means for receiving an off-hook signal from an off-hook switch included in said telephone.

44. An automatic telephone answering apparatus as claimed in claim 38, wherein said second storing means comprises a semiconductor memory, an a/d converter for converting a voice signal indicative of said incoming message and said conversation to a digital voice signal, a semiconductor memory for storing and reading said digital voice signal, and a d/a converter for converting read digital voice signal to an analog voice signal.

45. An automatic telephone answering apparatus as claimed in claim 38, further comprising out-going message recording means responsive to an out-going message command signal for inputting and storing said out-going message into said first storing means, said first storing means having:
  (a) a semiconductor memory;
  (b) an a/d converter for converting a voice signal indicative of said incoming message and said conversation to a digital voice signal;
  (c) a semiconductor memory for storing and reading said digital voice signal; and
  (d) a d/a converter for converting read digital voice signal to an analog voice signal.

46. An automatic telephone answering apparatus for sending an out-going message recorded in first storing means through a telephone line and recording incoming messages in second storing means, said automatic telephone answering apparatus further having a further mode for recording a conversation between an operator and a conversation partner, said second storing means storing one of said incoming messages and said conversation in response to first address signal, said second storing means reading one of said incoming messages and said conversation in response to second address signal, comprising:
  (a) first control means responsive to said second storing means for detecting an area of said second storing means where said incoming messages are stored and for storing data indicative of said area;
  (b) second control means for detecting an empty area of said second storing means in accordance with said stored data;
  (c) reproducing means responsive to a reproducing command signal for supplying said second address signal to said second storing means in accordance with said stored data, for causing said second storing means to read said stored one of said incoming messages with said supplied second address signal, and for reproducing said read one of said incoming messages;
  (d) line status detection means for detecting a line status of said telephone line; and
  (e) third control means responsive to said line status detection means for causing said second control means to detect said empty area when said line status detection means detects a start of use of said telephone line;
  (f) fourth control means responsive to a recording command signal for effecting said further mode by supplying said first address signal in accordance with said detected empty area to said second storing means in order to cause said second storing means to store said conversation with said supplied first address signal.

47. An automatic telephone answering apparatus as claimed in claim 46, further comprising a handset for communicating with said telephone line, said line status detection means comprising an off-hook switch actuated said handset for detecting off hook condition of said automatic telephone answering apparatus.

48. An automatic telephone answering apparatus as claimed in claim 46, wherein said line status detection means comprises ring signal detection means for detecting a ring signal sent from said telephone line.

49. An automatic telephone answering apparatus as claimed in claim 46, further comprising off-hook detection means for detecting an off-hook condition of a telephone connected to said telephone line in parallel.

50. An automatic telephone answering apparatus as claimed in claim 49, wherein said off-hook detection means comprises voltage decrease detection means for detecting said off-hook condition by detection of decrease in a voltage between lines of said telephone line.

51. An automatic telephone answering apparatus as claimed in claim 50, wherein said off-hook detection means comprises receiving means for receiving an off-hook signal from an off-hook switch included in said telephone.

52. An automatic telephone answering apparatus as claimed in claim 46, wherein said second storing means comprises a semiconductor memory, an a/d converter for converting a voice signal indicative of said incoming message and said conversation to a digital voice signal, a semiconductor memory for storing and reading said digital voice signal, and a d/a converter for converting read digital voice signal to an analog voice signal.

53. An automatic telephone answering apparatus as claimed in claim 46, further comprising message recording means responsive to an out-going message command signal for inputting and storing said out-going message into said first storing means, said first storing means having:
   (a) a semiconductor memory;
   (b) an a/d converter for converting a voice signal indicative of said incoming message and said conversation to a digital voice signal;
   (c) a semiconductor memory for storing and reading said digital voice signal; and
   (d) a d/a converter for converting read digital voice signal to an analog voice signal.

54. An automatic telephone answering apparatus for sending an out-going message recorded in first storing means through a telephone line and recording incoming messages in second storing means, said automatic telephone answering apparatus further having a further mode for recording a conversation between an operator and a conversation partner, said second storing means storing one of said incoming messages and said conversation in response to first address signal, said second storing means reading one of said incoming messages and said conversation in response to second address signal, comprising:
   (a) first control means responsive to said second storing means for detecting an area of said second storing means where said incoming messages are stored and for storing data indicative of said area;
   (b) second control means for detecting an empty area of said second storing means in accordance with said stored data;
   (c) reproducing means responsive to a reproducing command signal for supplying said second address signal to said second storing means in accordance with said stored data, for causing said second storing means to read said stored one of said incoming messages with said supplied second address signal, and for reproducing said read one of said incoming messages;
   (d) line status detection means for detecting a line status of said telephone line; and
   (e) third control means responsive to said line status detection means for causing said second control means to detect said empty area when said line status detection means detects a start of use of said telephone line and said reproducing means is reproducing one of said stored incoming messages, and for supplying said first address signal to said second storing means in order to store said conversation in said second storing means at a location defined by said first address signal.

* * * * *